United States Patent
Qin

(10) Patent No.: US 8,013,960 B2
(45) Date of Patent: Sep. 6, 2011

(54) TRANSFLECTIVE LIQUID CRYSTAL PANEL HAVING SOLID COLOR LAYER

(75) Inventor: Wei-Peng Qin, Shenzhen (CN)

(73) Assignees: Innocom Technology (Shenzhen) Co., Ltd., Shenzhen City, Guangdong Province (CN); Chimei Innolux Corporation, Miao-Li County (TW)

( * ) Notice: Subject to any disclaimer, the term of this patent is extended or adjusted under 35 U.S.C. 154(b) by 389 days.

(21) Appl. No.: 12/384,414

(22) Filed: Apr. 3, 2009

(65) Prior Publication Data
US 2009/0251648 A1    Oct. 8, 2009

(30) Foreign Application Priority Data
Apr. 3, 2008 (CN) .......................... 2008 1 0066400

(51) Int. Cl.
*G02F 1/1335* (2006.01)
(52) U.S. Cl. .................................. 349/114; 349/106
(58) Field of Classification Search .................. 349/114, 349/106
See application file for complete search history.

(56) References Cited

U.S. PATENT DOCUMENTS

| | | | | |
|---|---|---|---|---|
| 6,771,334 | B2 * | 8/2004 | Kubota et al. | 349/106 |
| 6,862,059 | B2 * | 3/2005 | Murai et al. | 349/114 |
| 7,030,946 | B2 | 4/2006 | Iijima et al. | |
| 2001/0004276 | A1 * | 6/2001 | Urabe et al. | 349/106 |

FOREIGN PATENT DOCUMENTS
CN      1198167 C     4/2005

* cited by examiner

*Primary Examiner* — Mike Qi
(74) *Attorney, Agent, or Firm* — Altis Law Group, Inc.

(57) ABSTRACT

A transflective liquid crystal panel includes a first substrate, a second substrate, a liquid crystal layer sandwiched between the two substrates, color filter film, transparent units, reflective units, and a solid color film. The color filter film is disposed on a surface of the first substrate adjacent to the liquid crystal layer. The color filter film includes filter units. The transparent units are configured for transmitting light. The reflective units are configured for reflecting light. Each filter unit corresponds to a transparent unit and a reflective unit. The solid color film covers at least the transparent units. A permeability of the solid color film relative to a predetermined color light waves exceeds that relative to light waves of other colors.

20 Claims, 2 Drawing Sheets

# TRANSFLECTIVE LIQUID CRYSTAL PANEL HAVING SOLID COLOR LAYER

BACKGROUND

1. Technical Field

The present invention relates to transflective liquid crystal panels, and particularly to a transflective liquid crystal panel having a solid color layer formed on one substrate thereof.

2. Description of Related Art

Because liquid crystal displays (LCDs) have the advantages of portability, low power consumption, and low radiation, they are widely used in portable devices such as notebooks, personal digital assistants (PDAs), video cameras, and others. LCDs can utilize transparent, reflective, and transflective display technologies. Transflective LCDs conserve considerable power by utilizing a part of available environmental light.

Referring to FIG. 5, a typical transflective liquid crystal panel 10 includes a first substrate 120, a color filter film 130, a second substrate 170, a multiplicity of transparent electrodes 160, a multiplicity of reflective electrodes 150, and a liquid crystal layer 140.

The first substrate 120 is disposed generally opposite to the second substrate 170. The liquid crystal layer 140 is sandwiched between the first substrate 120 and the second substrate 170. The color filter film 130 is disposed on an inner surface of the first substrate 120 adjacent to the liquid crystal layer 140. Each transparent electrode 160 is disposed on an inner surface of the second substrate 170 corresponding to a transparent region (not labeled). Each reflective electrode 150 is disposed on the inner surface of the second substrate 170 corresponding to a reflective region (not labeled).

The color filter film 130 includes a plurality of filter units (not labeled) such as red, green, and blue filter units, although FIG. 5 shows only one blue filter unit. The filter unit corresponds to the combined area of the transparent electrode 160 and the reflective electrode 150. The transparent electrode 160 can transmit light originating from a backlight module (not shown). The reflective electrode 150 can reflect environmental light originating from the front (top) of the transflective liquid crystal panel 10.

Light from the backlight module is transmitted through the second substrate 170, the transparent electrode 160, the liquid crystal layer 140, the color filter film 130, and the first substrate 120 in order. The environmental light enters the first substrate 120, and is transmitted through the color filter film 130 and the liquid crystal layer 140. The environmental light reaches a surface of the reflective electrode 150, and is reflected thereby through the liquid crystal layer 140, the color filter film 130, and the first substrate 120 again.

While light corresponding to the reflective region passes through the color filter film 130 twice, light corresponding to the transparent region only passes through the color filter film 130 once. Thus, chroma corresponding to the reflective region is substantially distinct from that corresponding to the transparent region. Accordingly, the color performance of the transflective liquid crystal panel 10 is liable to be unsatisfactory.

What is needed, therefore, is a transflective liquid crystal panel that can overcome the described limitations.

DETAILED DESCRIPTION

Reference will now be made to the drawings to describe various embodiments of the present invention in detail.

Figure 1:
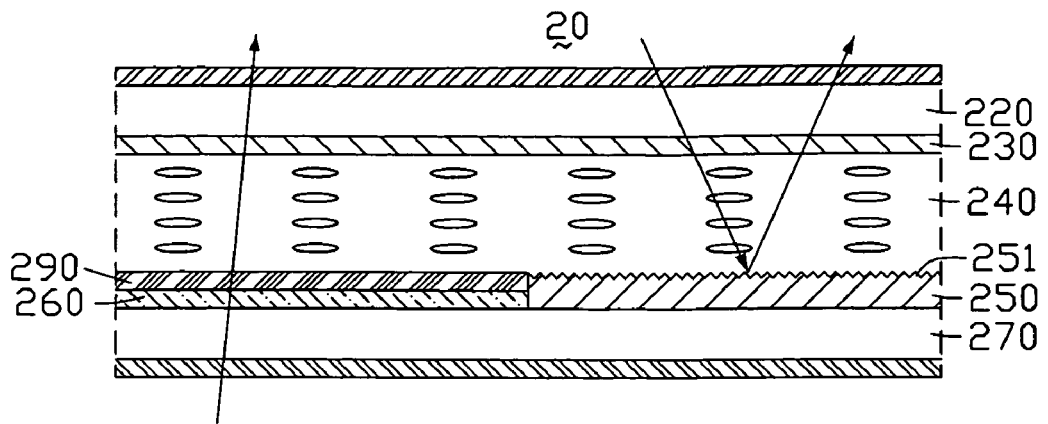
FIG. 1 is a cross-section of a pixel region of a transflective liquid crystal panel according to a first embodiment of the present invention.

FIG. 1 is a cross-section of a pixel region of a transflective liquid crystal panel according to a first embodiment of the present invention. The transflective liquid crystal panel 20 includes a first substrate 220, a color filter film 230, a second substrate 270, a plurality of transparent electrodes 260, a plurality of reflective electrodes 250, a plurality of solid color films (layers) 290, and a liquid crystal layer 240.

The first substrate 220 is disposed generally opposite to the second substrate 270. The liquid crystal layer 240 is sandwiched between the first substrate 220 and the second substrate 270. The color filter film 230 is disposed on an inner surface of the first substrate 220 adjacent to the liquid crystal layer 240. Each transparent electrode 260 is disposed on an inner surface of the second substrate 270 corresponding to a transparent region (not labeled). Each reflective electrode 250 is disposed on the inner surface of the second substrate 270 corresponding to a reflective region (not labeled). Each solid color film 290 is disposed on the corresponding transparent electrode 260. The transparent electrode 260 transmits light originating from a backlight module (not shown). The reflective electrode 250 reflects environmental light originating from outside a front (top) of the transflective liquid crystal panel 20.

The color filter film 230 includes a plurality of color filter units (not labeled, hereinafter "filter units") such as red, green, and blue filter units. In FIG. 1, only one filter unit, for example, a blue filter unit, is shown. The filter unit corresponds to the combined area of the transparent electrode 260 and the reflective electrode 250. A plurality of bumps (reflective structures) 251 are formed on a surface of the reflective electrode 250 adjacent to the liquid crystal layer 240. The bumps 251, each having a same tapered profile, are uniformly sized and arranged uniformly. In the illustrated embodiment, each of the bumps 251 has an isosceles triangle cross-section, and the bumps 251 are continuously arranged. The bumps 251 reflect and scatter light. A total thickness of the solid color film 290 and the transparent electrode 260 is substantially equal to a thickness of the reflective electrode 250. Permeability of the solid color film 290 relative to blue light exceeds that relative to light of other colors. Thus, blue chroma of the light, after passing through the solid color film 290, increases. The solid color film 290 functions as a chroma compensating film.

Light emitted from the backlight module passes through the second substrate 270, the transparent electrode 260, the solid color film 290, the liquid crystal layer 240, the color filter film 230, and the first substrate 220 in order. Environmental light enters the first substrate 220, and passes through the color filter film 230 and the liquid crystal layer 240, reaching the surface of the reflective electrode 250 and being reflected by the bumps 251. The reflected environmental light passes through the liquid crystal layer 240, the color filter film 230, and the first substrate 220 again.

Compared with other commonly deployed transflective liquid crystal panels, the transflective liquid crystal panel 20 includes a solid color film 290 disposed at each of the transparent regions. When the filter unit of the pixel region is a blue filter unit, the permeability of the solid color film 290 relative to blue light waves exceeds that relative to light waves of other colors. Thus, the blue chroma of the light after passing through the solid color film 290 increases. While the environmental light passes through the color filter film 230 twice, the light from the backlight module passes through the solid color film 290 once only, and passes through the color filter film 230 once only. That is, the chroma of the light from the backlight module is compensated by the solid color film 290. Therefore, the chroma of the output light corresponding to the transparent region is substantially the same as that of the output light corresponding to the reflective region.

In the case where another pixel region of the color filter film 230 has a red filter unit, the permeability of the corresponding solid color film 290 relative to red light waves exceeds that relative to light waves of other colors. In the case where still another pixel region of the color filter film 230 has a green filter unit, the permeability of the corresponding solid color film 290 relative to green light waves exceeds that relative to light waves of other colors.

Figure 2:
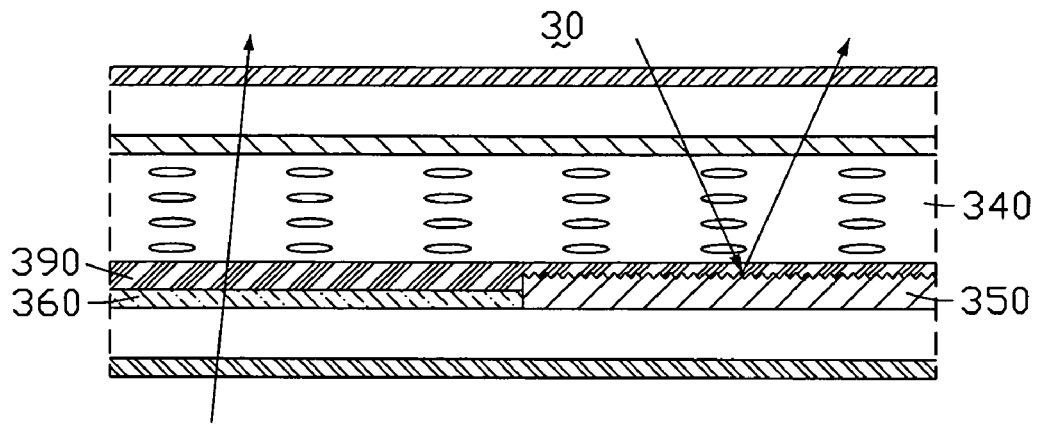
FIG. 2 is a cross-section of a pixel region of a transflective liquid crystal panel according to a second embodiment of the present invention.

Referring to FIG. 2, a cross-section of a pixel region of a transflective liquid crystal panel 30 according to a second embodiment of the present invention is shown. The transflective liquid crystal panel 30 differs from the transflective liquid crystal panel 20 in that a single solid color film 390 is disposed on both transparent electrodes 360 and reflective electrodes 350, adjacent to a liquid crystal layer 340. The solid color film 390 is a blue color film. A thickness H of the solid color film 390 corresponding to each transparent electrode 360 is more than twice a thickness h of the solid color film 390 corresponding to each reflective electrode 350. An entire surface of the solid color film 390 adjacent to the liquid crystal layer 340 is smooth.

Unlike the transflective liquid crystal panel 20, the solid color film 390 is disposed on an entire surface of both the transparent electrode 360 and the reflective electrode 350 in each pixel region of the transflective liquid crystal panel 30. The solid color film 390 makes images of the transflective liquid crystal panel 30 prone to blue coloring. Higher visual tendency toward blue, compared to red or green, makes the transflective liquid crystal panel 30 preferable for viewing. Moreover, the entire surface of the solid color film 390 adjacent to the liquid crystal layer 340 is smooth, so a mask process for manufacturing the solid color film 390 is not needed.

Figure 3:
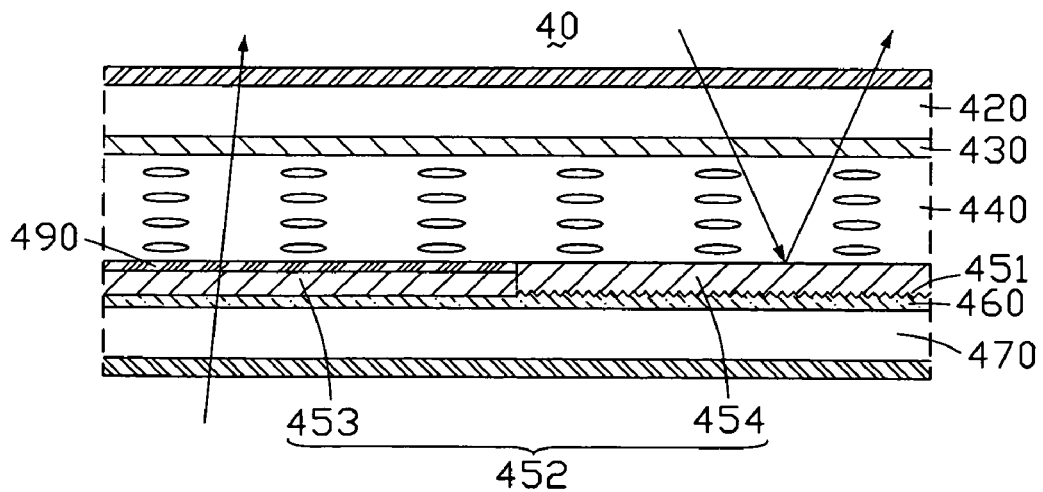
FIG. 3 is a cross-section of a pixel region of a transflective liquid crystal panel according to a third embodiment of the present invention.

FIG. 3 is a cross-section of a pixel region of a transflective liquid crystal panel 40 according to a third embodiment of the present invention. The transflective liquid crystal panel 40 includes a first substrate 420, a color filter film 430, a second substrate 470, a plurality of pixel electrodes 460, a transflective film 452, a plurality of solid color films 490, and a liquid crystal layer 440.

The first substrate 420 is disposed generally opposite to the second substrate 470. The liquid crystal layer 440 is sandwiched between the first substrate 420 and the second substrate 470. The color filter film 430 is disposed on an inner surface of the first substrate 420 adjacent to the liquid crystal layer 440. The color filter film 430 includes a plurality of filter units (not labeled) such as red, green, and blue filter units. In FIG. 3, only one filter unit, a blue filter unit, is shown. Each filter unit corresponds to the pixel electrode 460.

In each pixel region, the transflective film 452 includes a transparent part 453 and a reflective part 454. The transparent part 453 is disposed on an inner surface of the second substrate 470 corresponding to a transparent region (not labeled). The reflective part 454 is disposed on the inner surface of the second substrate 470 corresponding to a reflective region (not labeled). The solid color film 490 is disposed on the transparent part 453. A permeability of the solid color film 490 relative to blue light waves exceeds that relative to light waves of other colors. The transparent part 453 transmits light originating from a backlight module (not shown). The reflective part 454 reflects environmental light originating from outside a front (top) of the transflective liquid crystal panel 40. The transparent part 453 is thinner than the reflective part 454. A total thickness of the transparent part 453 and the solid color film 490 is equal to a thickness of the reflective part 454. A plurality of bumps (reflective structures) 451 are formed on a surface of the reflective part 454 facing away from the liquid crystal layer 440. Each bump 451 has a same tapered profile, and reflects and scatters light. In the illustrated embodiment, the bumps 451 are uniformly sized and arranged uniformly. Each of the bumps 251 has an isosceles triangle cross-section, and the bumps 251 are continuously arranged.

The transflective liquid crystal panel 40 has advantages similar to those of the transflective liquid crystal panel 20. That is, the chroma of the output light corresponding to the transparent region is substantially the same as that of the output light corresponding to the reflective region.

Figure 4:
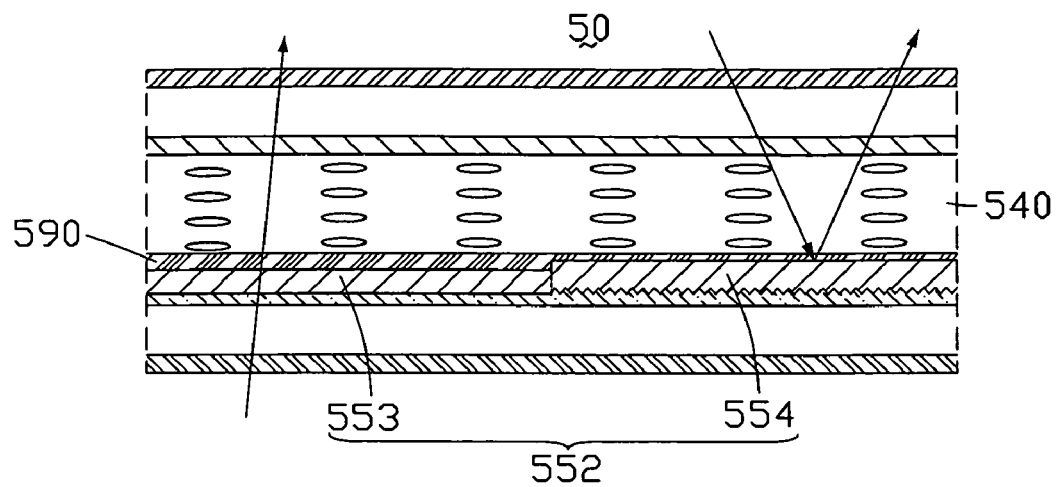
FIG. 4 is a cross-section of a pixel region of a transflective liquid crystal panel according to a fourth embodiment of the present invention.
Figure 5:
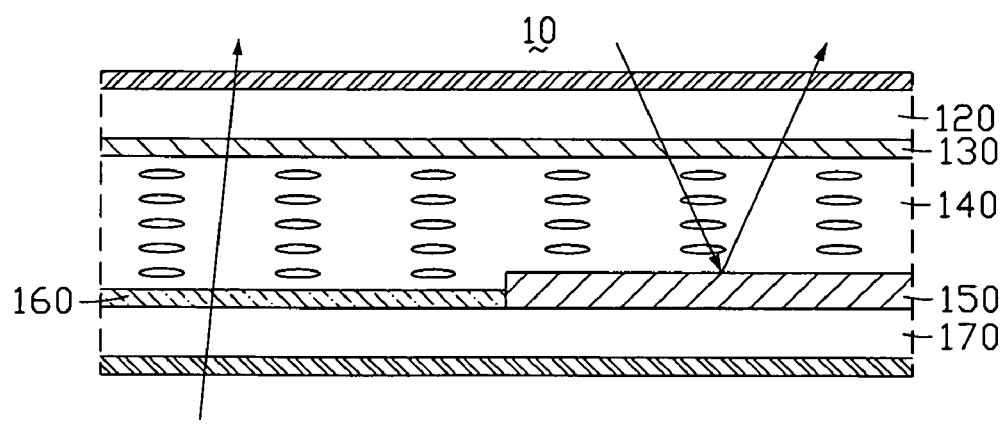
FIG. 5 is a cross-section of a pixel region of a frequently used transflective liquid crystal panel.

FIG. 4 is a cross-section of a pixel region of a transflective liquid crystal panel 50 according to a fourth embodiment of the present invention. The transflective liquid crystal panel 50 differs from the transflective liquid crystal panel 40 in that a single solid color film 590 is disposed on a surface of a transflective film 552, adjacent to a liquid crystal layer 540. The solid color film 590 is a blue color film. In each pixel region, the transflective film 552 includes a transparent part 553 and a reflective part 554. A thickness H of the solid color film 590 corresponding to the transparent part 553 is more than twice a thickness h of the solid color film 590 corresponding to the reflective part 554. An entire surface of the solid color film 590 adjacent to the liquid crystal layer 540 is smooth. The transflective liquid crystal panel 50 has advantages similar to those of the transflective liquid crystal panel 30 and the transflective liquid crystal panel 40.

In further and/or alternative embodiments, when there is a single solid color film, the solid color film can be red or green to satisfy different uses. In general, whether there are plural solid color films or whether there is a single solid color film, materials and/or colors of the solid color film(s) are selected to ensure that chroma difference between a transparent region and a reflective region in each pixel region is compensated or adjusted as desired.

It is to be understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:
1. A transflective liquid crystal panel, comprising:
a first substrate,
a second substrate generally opposite to the first substrate,
a liquid crystal layer sandwiched between the two substrates,
a color filter film disposed at a surface of the first substrate adjacent to the liquid crystal layer, the color filter film comprising a plurality of color filter units,
a plurality of transparent units configured for transmitting light, a plurality of reflective units configured for reflecting light, each color filter unit corresponding to a transparent unit and an adjacent reflective unit, and at least one solid color film covering at least the transparent units, wherein a permeability of each of the at least one solid color film relative to a predetermined color of light exceeds that relative to light of other colors.

2. The transflective liquid crystal panel of claim 1, wherein the at least one solid color film is a plurality of solid color films, which cover only the transparent units.

3. The transflective liquid crystal panel of claim 2, wherein a thickness of each reflective unit is substantially equal to a combined thickness of the corresponding solid color film and the corresponding transparent unit.

4. The transflective liquid crystal panel of claim 3, wherein each transparent unit is a transparent electrode, and each reflective unit is a reflective electrode.

5. The transflective liquid crystal panel of claim 4, wherein a plurality of bumps is disposed on a surface of the reflective electrode to reflect and scatter light, each bump having a tapered profile.

6. The transflective liquid crystal panel of claim 1, wherein the at least one solid color film is a single solid color film, which covers all of the transparent units and the reflective units.

7. The transflective liquid crystal panel of claim 6, wherein a thickness of the solid color film at each transparent unit is H, a thickness of the solid color film at the corresponding reflective unit is h, and H>2h.

8. The transflective liquid crystal panel of claim 1, wherein the transparent units and the reflective units cooperatively define a transflective film.

9. The transflective liquid crystal panel of claim 8, further comprising a plurality of pixel electrodes, each pixel electrode corresponding to a color filter unit, and being disposed between the transflective film and the second substrate.

10. The transflective liquid crystal panel of claim 9, wherein a plurality of bumps are formed on a surface of the pixel electrode corresponding to the reflective unit to reflect and scatter light, each bump having a tapered profile.

11. The transflective liquid crystal panel of claim 1, wherein a surface of the at least one solid color film adjacent to the liquid crystal layer is smooth.

12. The transflective liquid crystal panel of claim 1, wherein the solid color film is a blue solid color film.

13. A transflective liquid crystal panel, comprising:
a first substrate,
a second substrate generally opposite to the first substrate,
a liquid crystal layer sandwiched between the two substrates,
a plurality of pixel regions, each pixel region spanning through the two substrates and the liquid crystal layer therebetween,
a color filter film disposed at a surface of the first substrate adjacent to the liquid crystal layer, the color filter film comprising a plurality of color filter units,
a transflective layer comprising a plurality of transparent units and a plurality of reflective units, wherein in each pixel region, one pair comprising one transparent unit plus one reflective unit corresponds to one color filter unit, and
at least one solid color film, the at least one solid color film covering at least the transparent units, wherein in each pixel region, a permeability of the at least one solid color film relative to a predetermined color of light exceeds that relative to light of other colors.

14. The transflective liquid crystal panel of claim 13, wherein the reflective unit is a reflective electrode, and the transflective layer is a transparent electrode.

15. The transflective liquid crystal panel of claim 14, wherein the at least one solid color film is a plurality of solid color films, which cover the transparent electrodes, and a thickness of each reflective electrode substantially equals a combined thickness of the corresponding transparent electrode and the corresponding solid color film.

16. The transflective liquid crystal panel of claim 14, wherein in each pixel region, a plurality of bumps is formed on a surface of the reflective electrode to reflect and scatter light, each bump having a tapered profile.

17. The transflective liquid crystal panel of claim 13, wherein the at least one solid color film is a single solid color film, which covers the entire transflective layer, and in each pixel region, a combined thickness of the reflective electrode and the solid color film corresponding to the reflective electrode substantially equals a combined thickness of the transparent electrode and the solid color film corresponding to the transparent electrode.

18. The transflective liquid crystal panel of claim 13, wherein in each pixel region, a pixel electrode is disposed between the transflective layer and the second substrate.

19. A transflective liquid crystal panel, comprising:
a first substrate,
a second substrate generally opposite to the first substrate,
a liquid crystal layer sandwiched between the two substrates,
a color filter film disposed at a surface of the first substrate adjacent to the liquid crystal layer, the color filter film comprising a plurality of color filter units,
a plurality of transparent units configured for transmitting light,
a plurality of reflective units configured for reflecting light, each color filter unit corresponding to a transparent unit and an adjacent reflective unit, the transparent units being thinner than the reflective units, and
at least one solid color film covering at least the transparent units, the at least one solid color film configured as at least one chroma adjusting film, such that a chroma of light originating from an associated backlight module and output from the transflective liquid crystal panel is adjusted to be at least more similar to a chroma of light originating from the ambient environment and output from the transflective liquid crystal panel.

20. The transflective liquid crystal panel of claim 19, wherein the at least one solid color film is either a single solid color film or a plurality of solid color films, when the at least one solid color film is a single solid color film, the solid color film covers all of the transparent units and the reflective units and is configured as a chroma adjusting film such that images of the transflective liquid crystal panel are prone to have a coloring corresponding to a coloring of the solid color film, and when the at least one solid color film is a plurality of solid color films, the solid color films cover only the transparent units and are configured as chroma compensating films, such that a chroma of light originating from the associated backlight module and output from each transparent unit is substantially the same as a chroma of light originating from the ambient environment and output from the corresponding adjacent reflective unit.

* * * * *